United States Patent
Otsuki et al.

(10) Patent No.: US 7,417,820 B2
(45) Date of Patent: Aug. 26, 2008

(54) HEAD SUPPORT MECHANISM, MAGNETIC HEAD ASSEMBLY, AND MAGNETIC DISK DRIVE APPARATUS

(75) Inventors: Mitsuo Otsuki, Tokyo (JP); Masaru Hirose, Tokyo (JP); Yoshihiro Kudo, Tokyo (JP); Katsuki Kurihara, Tokyo (JP); Yuji Ito, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/609,020

(22) Filed: Dec. 11, 2006

(65) Prior Publication Data

US 2008/0137233 A1 Jun. 12, 2008

(51) Int. Cl.
G11B 5/60 (2006.01)
G11B 21/21 (2006.01)

(52) U.S. Cl. .................................... 360/75
(58) Field of Classification Search .............. None
See application file for complete search history.

(56) References Cited

U.S. PATENT DOCUMENTS

| | | | |
|---|---|---|---|
| 5,991,113 A * | 11/1999 | Meyer et al. ............... | 360/75 |
| 6,376,964 B1 * | 4/2002 | Young et al. .............. | 360/244.5 |
| 6,597,539 B1 * | 7/2003 | Stupp et al. ............... | 360/245.7 |
| 6,700,727 B1 * | 3/2004 | Crane et al. ............... | 360/75 |
| 6,707,646 B2 * | 3/2004 | Berger et al. .............. | 360/294.7 |
| 6,950,266 B1 | 9/2005 | McCaslin et al. | |
| 6,952,330 B1 * | 10/2005 | Riddering et al. ......... | 360/294.7 |
| 6,954,339 B2 * | 10/2005 | Bement et al. ............ | 360/294.7 |
| 2007/0247739 A1 * | 10/2007 | Iida .............................. | 360/75 |
| 2008/0002299 A1 * | 1/2008 | Thurn ....................... | 360/234.6 |

FOREIGN PATENT DOCUMENTS

JP  2006-172620  6/2006

* cited by examiner

Primary Examiner—Hoa T. Nguyen
Assistant Examiner—James L Habermehl
(74) Attorney, Agent, or Firm—Oblon, Spivak, McClelland, Maier & Neustadt, P.C.

(57) ABSTRACT

A head support mechanism includes a suspension for supporting a magnetic head slider with a thin-film magnetic head, having a slider mounting section on which the magnetic head slider is fixed, and a heating unit formed on the slider mounting section of the suspension. The heating unit is capable of producing heat.

8 Claims, 14 Drawing Sheets

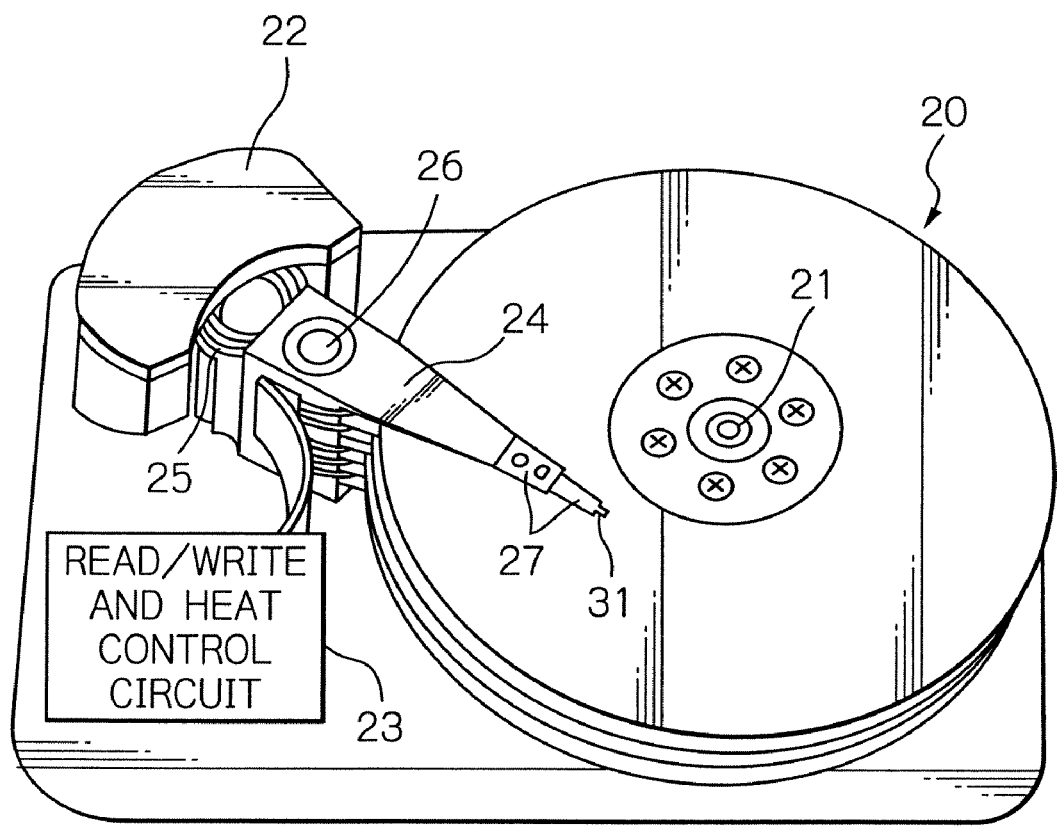

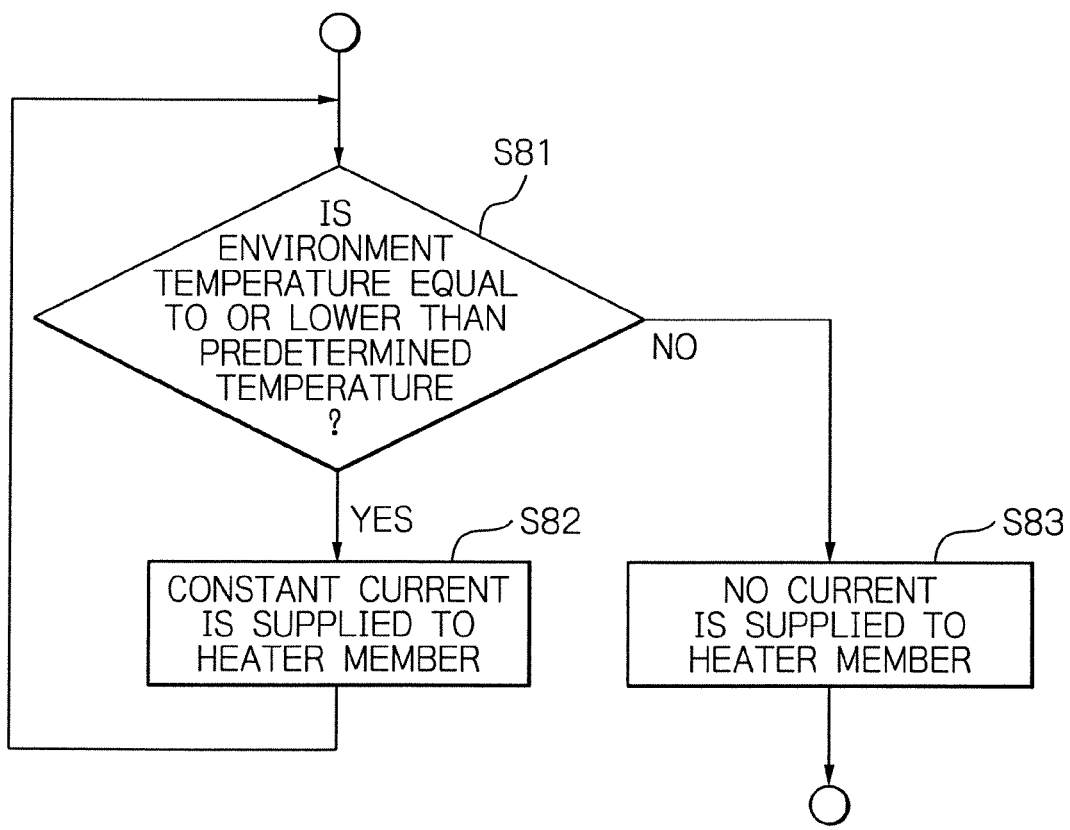

HEAD SUPPORT MECHANISM, MAGNETIC HEAD ASSEMBLY, AND MAGNETIC DISK DRIVE APPARATUS

BACKGROUND OF THE INVENTION

1. Field of the Invention

The present invention relates to a head support mechanism for supporting a magnetic head slider that includes a thin-film magnetic head, to a magnetic head assembly with the head support mechanism, and to a magnetic disk drive apparatus with the magnetic head assembly.

2. Description of the Related Art

In a hard disk drive (HDD) apparatus, thin-film magnetic head elements for writing or recording magnetic information into and/or reading or reproducing magnetic information from magnetic disks are in general formed on magnetic head sliders flying in operation above the rotating magnetic disks. The sliders are supported at top end sections of head support mechanisms configured by suspensions or support arms, respectively.

Recently, such HDD apparatus is assembled not only in a personal computer but also in a mobile equipment such as for example a portable digital audio player, a digital video camera, a mobile phone, a car navigation apparatus and other mobile gear. In order to assemble in the mobile equipment, required is increased recording and reproducing density to satisfy further miniaturization and higher data storage capacities of the HDD apparatus. This requirement in the increased recording and reproducing density accelerates miniaturization in the magnetic head element and lower flying height of the magnetic head slider.

On the other hand, for assembling in the mobile equipment, the HDD apparatus is required to endure a hostile environment in temperature, particularly in low temperature. More concretely, the HDD apparatus to be mounted in the mobile equipment is required to operate in environment conditions of low temperature of about to −30° C. or −40° C. that is extremely lower than the environment conditions of −10° C. for a general HDD apparatus.

A head suspension assembly of the HDD apparatus is in general assembled by adhering using a resin adhesive a magnetic head slider to a suspension having a thermal expansion coefficient different from that of the magnetic head slider. Therefore, a crown amount of the magnetic head slider changes depending upon change in its temperature environment due to the thermal expansion coefficient difference. Particularly, under the low temperature environment, because the thermal expansion coefficient of the suspension is larger than that of the magnetic head slider, a compression force will be applied to the magnetic head slider from the suspension to produce crown deformation of the slider.

FIGS. 1a and 1b provide an explanation of crown deformation of a magnetic head slider under a low temperature environment according to the conventional art. FIG. 1a illustrates the state of a head suspension assembly under an ordinary temperature environment, and FIG. 1b illustrates the state of the head suspension assembly under an extremely low temperature environment.

As shown in FIG. 1a, under the ordinary temperature environment, no thermal effect on a tongue portion 10 of a flexure and on a magnetic head slider 12 fixed to the flexure by a resin adhesive 11 occurs, and therefore no compression force is applied from the flexure to the slider 12. However, under the extremely low temperature environment, as shown in FIG. 1b, because the tongue portion 10 of the flexure deforms or compressed larger than the magnetic head slider 12, occurred is a crown deformation of the slider, that is, a deformation for moving the trailing edge and the leading edge of the slider away from the surface of a magnetic disk 13 to which the slider faced. If such crown deformation occurs, a spacing between a write and read magnetic head element 14 and the surface of the magnetic disk 13 increases to greatly decrease the write and read characteristics of the magnetic head elements.

U.S. Pat. No. 6,950,266 discloses a flying height control method for a magnetic head slider in which a piezoelectric actuator is inserted between a tongue portion of a flexure and the magnetic head slider so as to compensate the crown deformation of the slider.

However, according to this known method described in U.S. Pat. No. 6,950,266, the structure of a magnetic head assembly becomes complicate and, due to insertion of the piezoelectric actuator having a significant thickness between the tongue portion and the slider, the design and fabrication of the magnetic head assembly become difficult to increase the manufacturing cost. Further, the control method of the piezoelectric actuator for compensating the crown deformation of the slider also becomes complicate.

SUMMARY OF THE INVENTION

It is therefore an object of the present invention to provide a head support mechanism for supporting a magnetic head slider that includes a thin-film magnetic head, a magnetic head assembly with the head support mechanism, and a magnetic disk drive apparatus with the magnetic head assembly, whereby possible crown deformation of the magnetic head slider under a low temperature environment can be prevented with a simple structure and a low manufacturing cost.

According to the present invention, a head support mechanism includes a suspension for supporting a magnetic head slider with a thin-film magnetic head, having a slider mounting section on which the magnetic head slider is fixed, and a heating unit formed on the slider mounting section of the suspension. The heating unit is capable of producing heat.

The heating unit capable of producing heat is formed on the slider mounting section of the suspension. Thus, by energizing this heater unit under a low temperature environment, possible crown deformation of the magnetic head slider caused by the difference in thermal expansion coefficient between the magnetic head slider and the suspension can be effectively prevented. This prevention of crown deformation can be extremely easily achieved by means of a simple structure, that is, forming of the heating unit on the slider mounting section. Because of the simple structure, its design and fabrication become easy resulting a low manufacturing cost.

It is preferred that the heating unit includes a heater member patterned on the slider mounting section or patterned in a flexible printed circuit (FPC) fixed on the slider mounting section.

It is also preferred that the suspension includes a resilient flexure containing the slider mounting section and a load beam for supporting the flexure.

It is further preferred that the slider mounting section is a tongue portion of the flexure, and that the tongue portion has a thermal expansion coefficient greater than that of a magnetic head slider to be fixed to the tongue portion. In this case, preferably, the magnetic head slider to be fixed to the slider mounting section is made of a ceramic material and the flexure is made of a metal material.

According to the present invention, also, a magnetic head assembly includes a magnetic head slider with a thin-film magnetic head, a suspension having a slider mounting section, for supporting the magnetic head slider fixed to the slider mounting section, and a heating unit formed on the slider mounting section of the suspension. The heating unit is capable of producing heat. Here, the magnetic head assembly means an assembly mechanically and electrically assembling a composite thin-film magnetic head or a magnetic head slider having a write head element and a read head element with its support member. More concretely, an assembly of a magnetic head slider and a suspension is in general called as a head gimbal assembly (HGA), an assembly of a magnetic head slider, a suspension and a support arm for supporting the suspension is in general called as a head arm assembly (HAA), and an assembly stacking a plurality of HAAs is in general called as a head stack assembly (HSA).

The heating unit capable of producing heat is formed on the slider mounting section of the suspension. Thus, by energizing this heater unit under a low temperature environment, possible crown deformation of the magnetic head slider caused by the difference in thermal expansion coefficient between the magnetic head slider and the suspension can be effectively prevented. This prevention of crown deformation can be extremely easily achieved by means of a simple structure, that is, forming of the heating unit on the slider mounting section. Because of the simple structure, its design and fabrication become easy resulting a low manufacturing cost.

It is preferred that the heating unit includes a heater member patterned on the slider mounting section or patterned in a FPC fixed on the slider mounting section.

It is also preferred that the suspension includes a resilient flexure containing the slider mounting section and a load beam for supporting the flexure.

It is further preferred that the slider mounting section is a tongue portion of the flexure, and that the tongue portion has a thermal expansion coefficient greater than that of a magnetic head slider to be fixed to the tongue portion. In this case, preferably, the magnetic head slider to be fixed to the slider mounting section is made of a ceramic material and the flexure is made of a metal material.

According to the present invention, further, a magnetic disk drive apparatus includes a magnetic head assembly and a magnetic disk to which a magnetic head slider of the magnetic head assembly faces. The magnetic head assembly includes the magnetic head slider with a thin-film magnetic head, a suspension having a slider mounting section, for supporting the magnetic head slider fixed to the slider mounting section, and a heating unit formed on the slider mounting section of the suspension. The heating unit is capable of producing heat.

The heating unit capable of producing heat is formed on the slider mounting section of the suspension. Thus, by energizing this heater unit under a low temperature environment, possible crown deformation of the magnetic head slider caused by the difference in thermal expansion coefficient between the magnetic head slider and the suspension can be effectively prevented. This prevention of crown deformation can be extremely easily achieved by means of a simple structure, that is, forming of the heating unit on the slider mounting section. Because of the simple structure, its design and fabrication become easy resulting a low manufacturing cost.

It is preferred that the heating unit includes a heater member patterned on the slider mounting section or patterned in a FPC fixed on the slider mounting section.

It is also preferred that the heating unit includes a heater member patterned on the slider mounting section or patterned in a flexible printed circuit fixed on the slider mounting section.

It is preferred that the magnetic disk drive apparatus further includes an electrical control unit electrically connected to the heater member, for driving the heater member to produce heat under a low temperature environment. In this case, preferably the electrical control unit has a low temperature environment detection unit for detecting that the magnetic disk drive apparatus is under a low temperature environment, and a current control unit for controlling a current flowing through the heater member in accordance with the detected result of the low temperature environment detection unit.

The low temperature environment detection unit may have a temperature detection unit for detecting environment temperature of the magnetic disk drive apparatus, and the current control unit may have a unit for supplying a constant current to the heater member only when the environment temperature detected by the temperature detection unit is equal to or lower than a predetermined temperature.

The low temperature environment detection unit may have a temperature detection unit for detecting environment temperature of the magnetic disk drive apparatus, and the current control unit may have a unit for substantially continuously changing a current flowing through the heater member depending upon the environment temperature detected by the temperature detection unit.

The low temperature environment detection unit may have a temperature detection unit for detecting environment temperature of the magnetic disk drive apparatus, and the current control unit may have a unit for changing a current flowing through the heater member step-by-step depending upon the environment temperature detected by the temperature detection unit.

It is also preferred that the suspension includes a resilient flexure containing the slider mounting section and a load beam for supporting the flexure.

It is further preferred that the slider mounting section is a tongue portion of the flexure, and that the tongue portion has a thermal expansion coefficient greater than that of a magnetic head slider to be fixed to the tongue portion. In this case, preferably, the magnetic head slider to be fixed to the slider mounting section is made of a ceramic material and the flexure is made of a metal material.

Further objects and advantages of the present invention will be apparent from the following description of the preferred embodiments of the invention as illustrated in the accompanying drawings.

BRIEF DESCRIPTION OF THE DRAWINGS

FIG. 2 is an oblique view schematically illustrating main components of a magnetic disk drive apparatus as a preferred embodiment according to the present invention;

FIG. 8 is a flow diagram illustrating an example of a drive control process of a heater member, executed by a computer shown in FIG. 7;

DESCRIPTION OF THE PREFERRED EMBODIMENTS

Figure 1A:
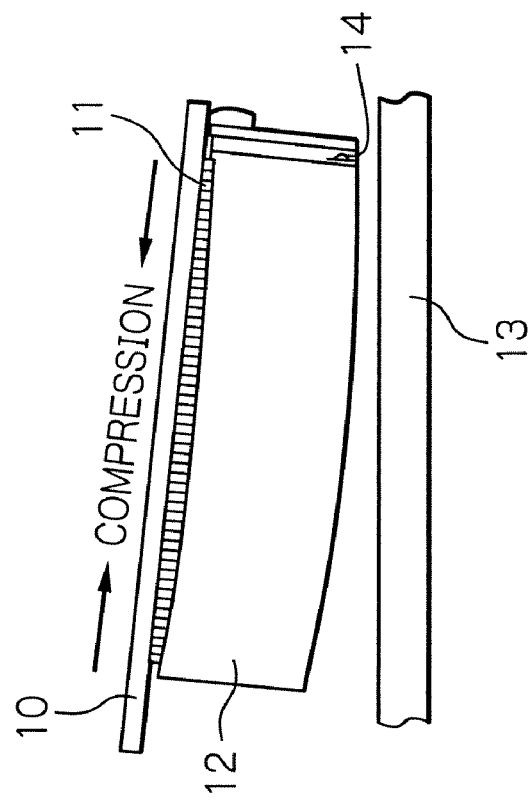
FIGS. 1a and 1b, already described, are views for providing an explanation of crown deformation of the magnetic head slider under a low temperature environment according to the conventional art.
Figure 1B:
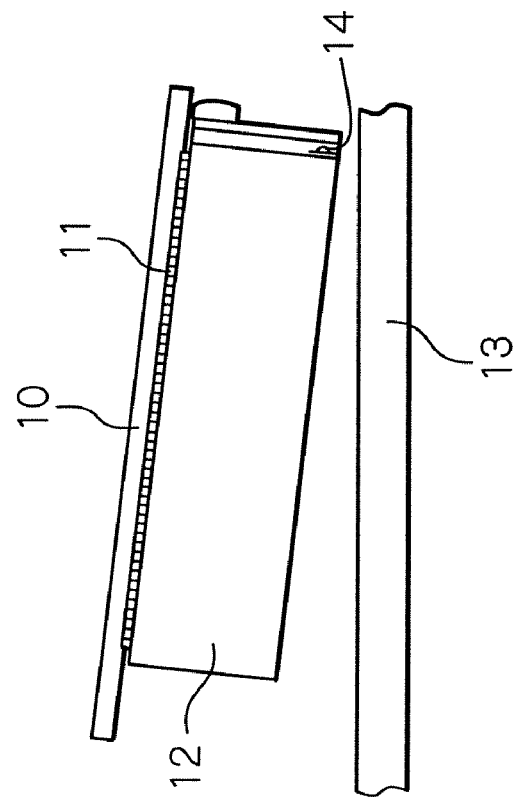
Figure 3:
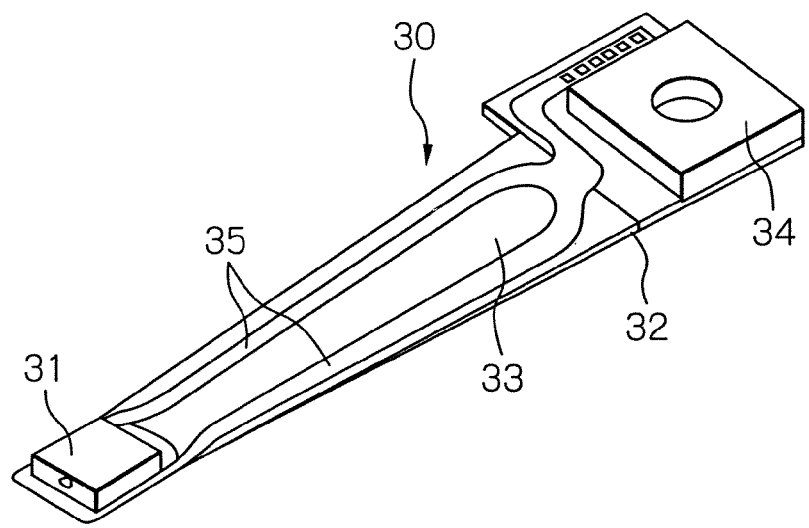
FIG. 3 is an oblique view illustrating a configuration example of an HGA shown in FIG. 2.
Figure 4:
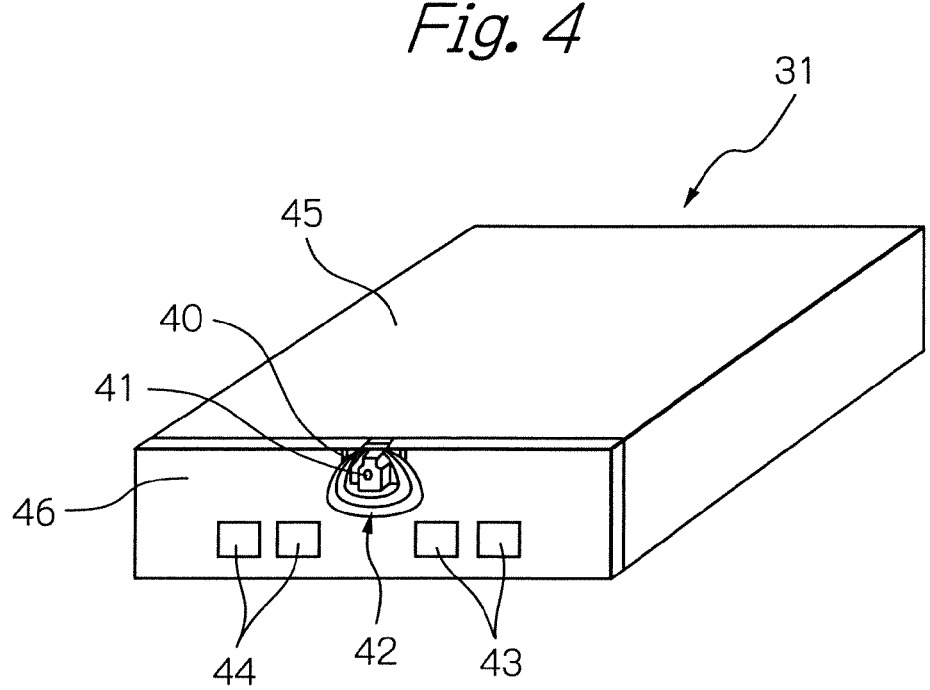
FIG. 4 is an oblique view illustrating a composite thin-film magnetic head mounted at a top end section of the HGA shown in FIG. 3.

FIG. 2 schematically illustrates main components of a magnetic disk drive apparatus as a preferred embodiment according to the present invention, FIG. 3 illustrates a configuration example of an HGA shown in FIG. 2, and FIG. 4 illustrates a composite thin-film magnetic head mounted at a top end section of the HGA shown in FIG. 3.

In FIG. 2, reference numeral 20 denotes a plurality of magnetic hard disks rotating around a rotation axis of a spindle motor 21, 22 denotes an assembly carriage device for positioning each composite thin-film magnetic head or magnetic head slider on a track of each disk, and 23 denotes a read/write and heat control circuit for controlling read and write operations and heating operations of a heater member, respectively.

The assembly carriage device 22 has a plurality of drive arms 24 stacked along a pivot-bearing axis 26. These drive arms 24 are capable of rotating around the axis 26 and driven by a voice coil motor (VCM) 25. An HGA 27 is mounted on a top section of each arm 24. Each HGA 27 has the composite thin-film magnetic head or the magnetic head slider 31 mounted at its top end section so that the slider faces a surface of each magnetic disk 20. In modifications, a single magnetic disk 20, a single drive arm 24 and a single HGA 27 may be provided.

As shown in FIG. 3, the HGA is assembled by fixing the composite thin-film magnetic head 31 having an inductive write head element and a CPP-structure MR read head element to a top end section of a suspension 30, and by electrically connecting one ends of trace conductors of a lead conductor member 35 to terminal electrodes of the thin-film magnetic head 31.

The suspension 30 is substantially constituted by a load beam 32 for producing a load to be applied to the composite thin-film magnetic head 31, a flexure 33 fixed on and supported by the load beam 32, a base plate 34 attached or formed at a base end section of the load beam 32, and the lead conductor member 35 fixed on the flexure 33 and the load beam 32 and provided with the trace conductors and connection pads electrically connected both ends of the trace conductors. The load beam 32 has certain resilience and is formed from a metal material plate such as a stainless steel plate, the flexure has enough resilience and is formed from a metal material plate such as a stainless steel plate, and the base plate 34 is formed from a metal material plate such as a stainless steel plate.

A structure of the suspension of the HGA that is the magnetic head assembly according to the present invention is not limited to the aforementioned structure. Furthermore, although it is not shown, a head drive IC chip may be mounted on a middle of the suspension 30.

As shown in FIG. 4, the magnetic head slider 31 in this embodiment has, on its element-forming surface 46 that is one side surface of the head with respect to its bottom surface consisting of an air bearing surface (ABS) 45, a composite thin-film magnetic head 42 consisting of a magnetoresistive effect (MR) read head element 40 and an inductive write head element 41 sequentially laminated on a substrate made of a ceramic material such as AlTiC (alumina-titanium carbide ($Al_2O_3$—TiC)), and four signal electrode terminals 43 and 44 electrically connected to these elements 40 and 41. The positions of these electrode terminals are not limited to these shown in FIG. 4.

Figure 5:
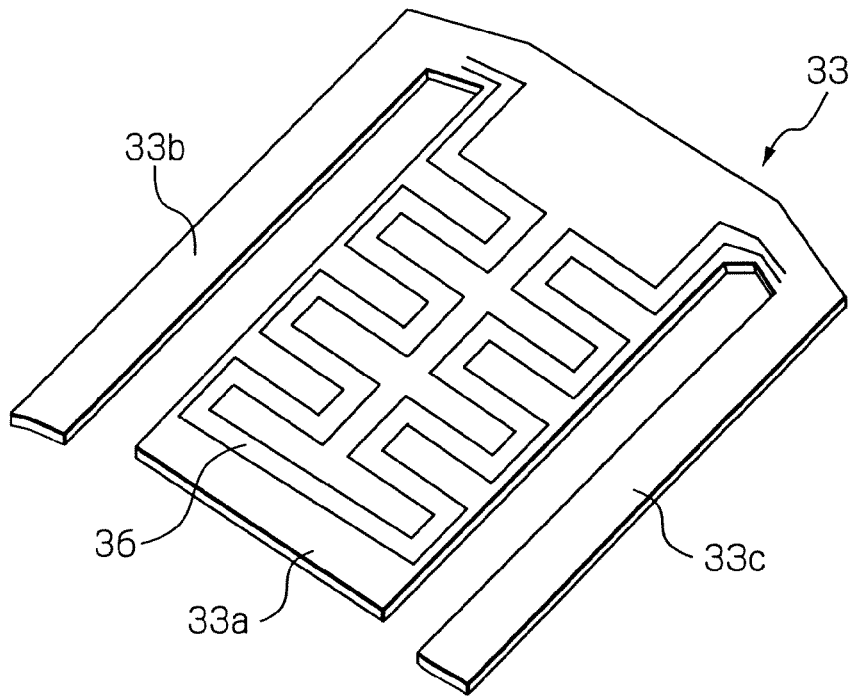
FIG. 5 is an oblique view illustrating a configuration of a tongue portion formed at a top end section of a flexure of the HGA shown in FIG. 3.
Figure 6:
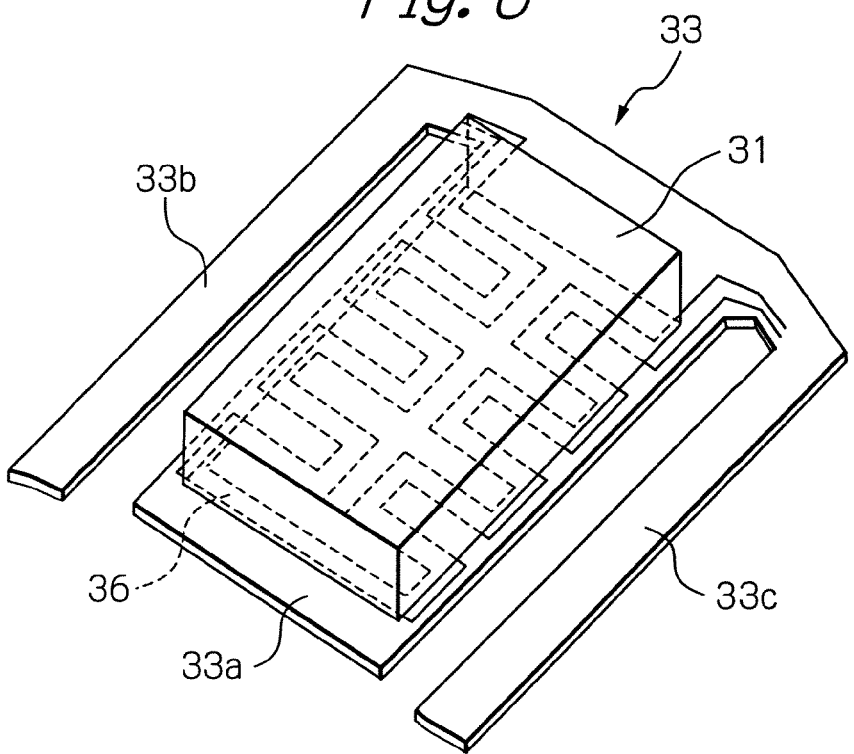
FIG. 6 is an oblique view illustrating the state in which a magnetic head slider is mounted on the tongue portion of the flexure shown in FIG. 5.

FIG. 5 illustrates a configuration of a tongue portion formed at the top end section of the flexure of the HGA shown in FIG. 3, and FIG. 6 illustrates the state in which a magnetic head slider is mounted on the tongue portion of this flexure.

As shown in these figures, the flexure 33 has at its top end section a resilient tongue portion 33a for mounting the slider 31, and outrigger portions 33b and 33c positioned at both sides of the tongue portion 33a with spaces. On the tongue portion 33a of the flexure 33, an electrothermal heater member 36 is formed in a pattern.

To the tongue portion 33a of the flexure 33, as shown in FIG. 6, the magnetic head slider 31 is fixed by using a resin adhesive. Thus, the heater member 36 is inserted between the tongue portion 33a and the slider 31. The resin adhesive used may be for example an ultraviolet cure resin or a thermosetting resin.

The heater member 36 is constituted by a thin-film of an electrothermal material such as a tungsten (W) or a nickel chrome (NiCr) for example. It is desired that the heater member 36 is formed as a pattern to cover the whole surface of the tongue portion 33a. However, the practical pattern shape of this heater member 36 can be freely designed. Although it is not shown in the figure, both ends of the heater member 36 are electrically connected to one ends of the trace conductors of the lead conductor member 35.

Figure 7:
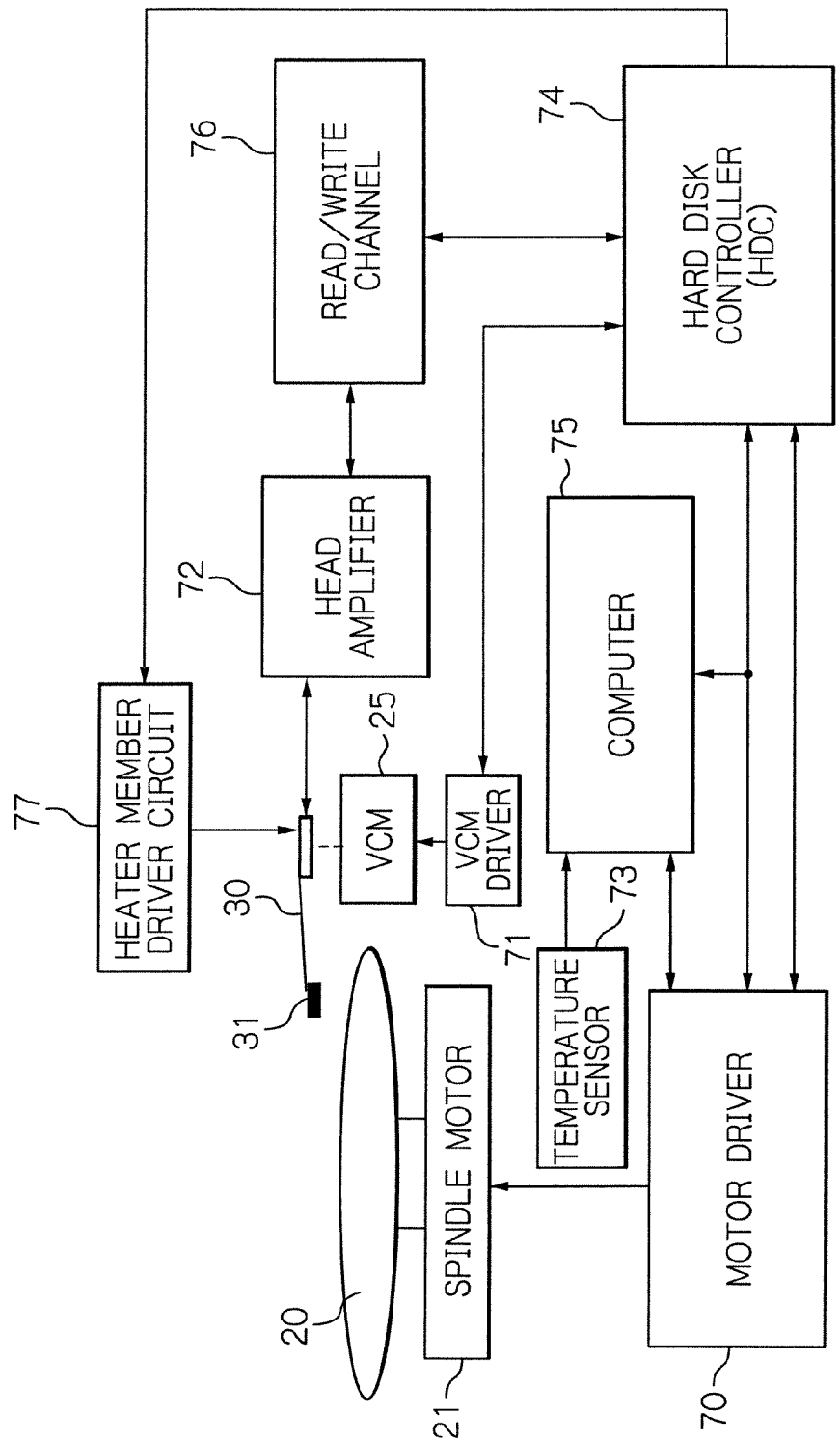
FIG. 7 is a block diagram schematically illustrating an electrical configuration of the magnetic disk drive apparatus shown in FIG. 2.

FIG. 7 schematically illustrates an electrical configuration of the magnetic disk drive apparatus in this embodiment.

In the figure, reference numeral 70 denotes a motor driver of the spindle motor 21 for rotationally driving the magnetic hard disks 20, 71 denotes a VCM driver of the VCM 25, 72 denotes a head amplifier for the read head element 40 and the write head element 41, 73 denotes a temperature sensor, and 74 denotes a hard disk controller (HDC) for controlling, in response to instructions from a computer 75, the motor driver 70, the VCM driver 71, the head amplifier 72 through a read/write channel 76 and a heater member driver circuit 77, respectively. The heater member driver circuit 77 provides current for energizing the heater member 36. The read/write and heat control circuit 23 shown in FIG. 2 contains these motor driver 70, VCM driver 71, head amplifier 72, HDC 74, computer 75, read/write channel 76 and heater member driver circuit 77.

The temperature sensor 73 is mounted at a position near the magnetic head slider 31, for example on the lead conductor member of the assembly carriage device 22, to detect the temperature in the HDD apparatus as an environment temperature. As for the temperature sensor 73, although a thermistor element is used for example in this embodiment, any temperature sensing element may be used in the present invention. An analog temperature signal from the temperature sensor 73 is converted into a digital temperature signal by an A/D converter contained in the computer 75, and then captured by this computer 75.

FIG. 8 illustrates an example of a drive control process of the heater member, executed by the computer 75 of this embodiment.

This drive control process is repeatedly executed for example at a predetermined time interval when the HDD apparatus is in operation. First, using the digital temperature signal detected by the temperature sensor 73 and A/D converted, whether the environment temperature is equal to or lower than a predetermined temperature for example 5° C. (or 0° C.) or not is judged (Step S81).

If it is judged YES, that is if the environment temperature is equal to or lower than 5° C. (or 0° C.), the heater member driver circuit 77 is energized to supply a constant current such as a current for providing the power of 120 mW for example to the heater member 36 (Step S82).

Then, the judgment process at the step S81 is executed again.

If it is judged NO at the step S81, that is if the environment temperature is higher than 5° C. (or 0° C.), the heater member driver circuit 77 is instructed to supply no current to the heater member 36 and this drive control process is finished (Step S83).

By supplying the constant current such as the current for providing the power of 120 mW for example to the heater member 36, this heater member 36 heats both the tongue portion 33a of the flexure 33 and the magnetic head slider 31.

Figure 9A:
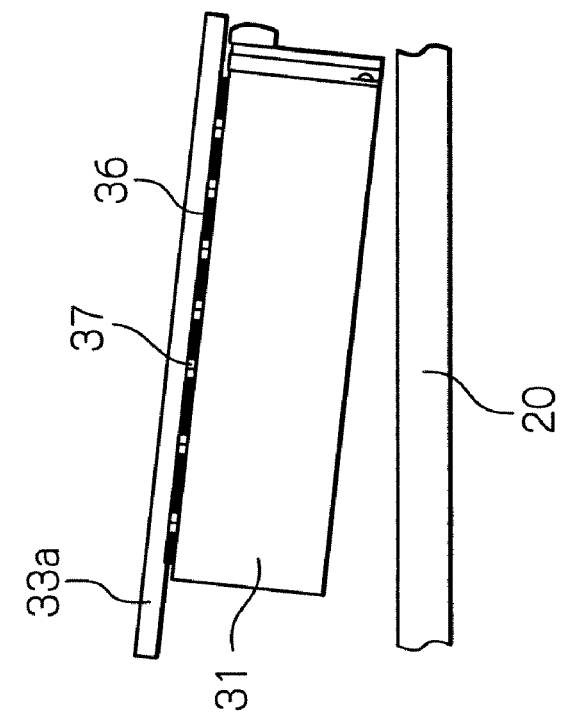
FIGS. 9a and 9b are views for providing an explanation how crown deformation of the magnetic head slider under a low temperature environment is prevented according to the present invention.
Figure 9B:
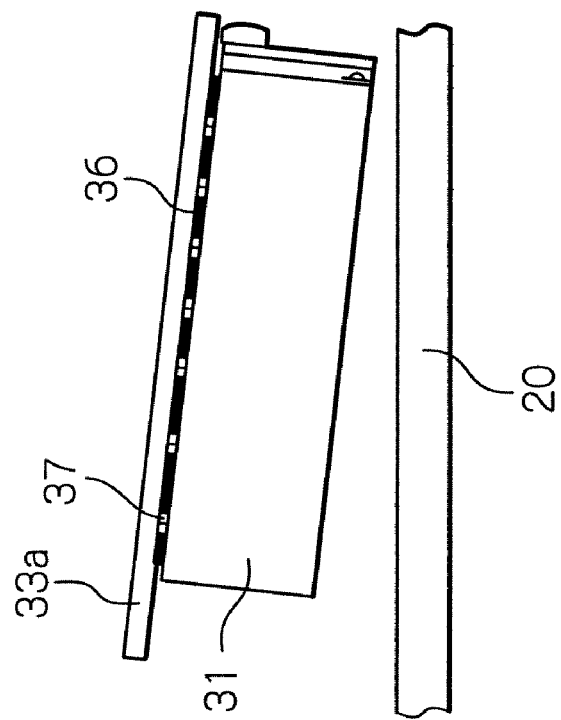

FIGS. 9a and 9b provide explanation how crown deformation of the magnetic head slider under a low temperature environment is prevented according to the present invention, where FIG. 9a indicates the state under the ordinary temperature environment and FIG. 9b indicates the state under the low temperature environment.

As shown in FIG. 9a, under the room temperature environment, no thermal effect on the tongue portion 33a of the flexure and on the magnetic head slider 31 fixed to the tongue portion 33a by a resin adhesive 37 occurs, and therefore no compression force is applied from the flexure to the slider 31. Also, under the low temperature environment at a temperature equal to or lower than 5° C. (or 0° C.), as shown in FIG. 9b, because both the tongue portion 33a of the flexure 33 and the magnetic head slider 31 are heated by the heater member 36, no crown deformation of the slider 31 occurs even when the environment temperature of the HDD apparatus is extremely low. Therefore, a spacing between a write and read magnetic head element of the magnetic head slider 31 and the surface of the magnetic disk 20 never changes resulting to prevent decrease in the write and read characteristics of the magnetic head elements from occurring.

Figure 10A:
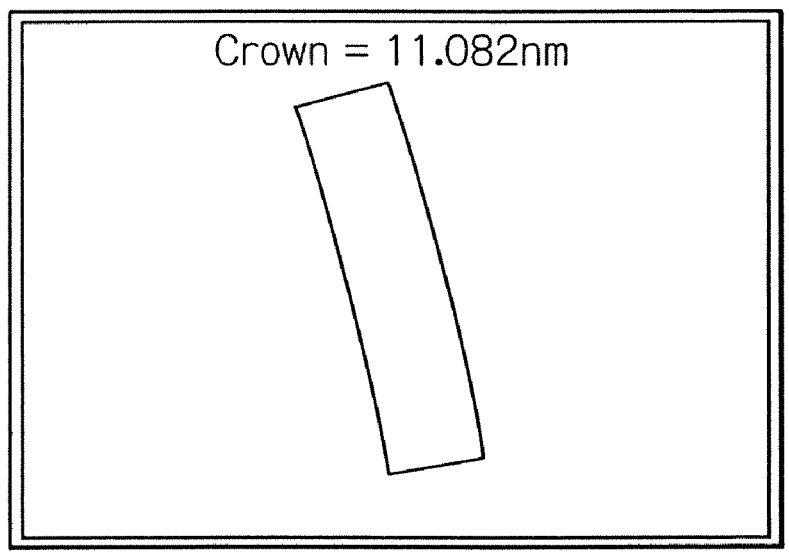
FIGS. 10a and 10b are views illustrating the results of simulation of crown deformation of the magnetic head slider with and without heating of the heater member under a low temperature environment of −35° C., respectively.
Figure 10B:
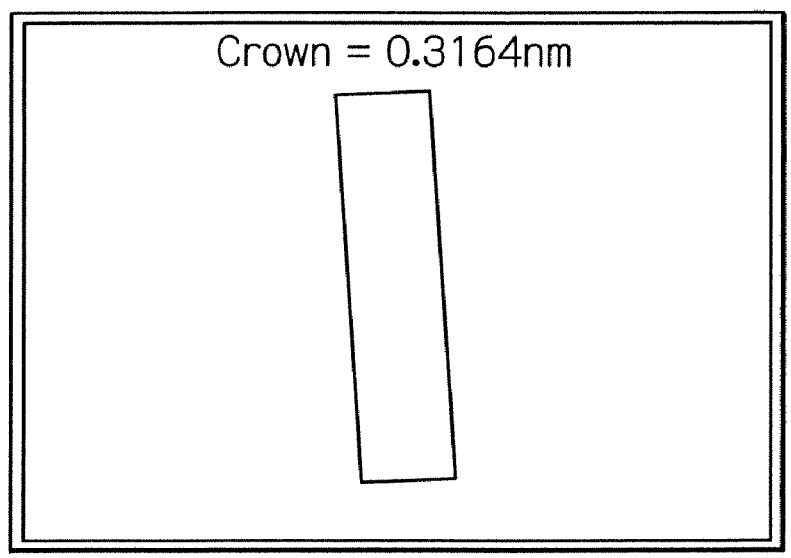

FIGS. 10a and 10b illustrate the results of simulation of crown deformation of the magnetic head slider with and without heating of the heater member under a low temperature environment of −35° C., respectively.

According to this simulation, the following facts were confirmed. Under the low temperature environment of −35° C., if there is no heating of the heater member, that is, if there is no heater member as in the conventional art, the crown amount becomes 11.082 nm as shown in FIG. 10a. This result indicates that significantly large crown deformation occurs under this condition. Contrary to this, as shown in FIG. 10b, under the low temperature environment of −35° C., if there is heating of the heater member, the crown amount becomes 0.3162 nm. This result indicates that crown deformation hardly occurs under the condition according to the present invention.

Figure 11A:
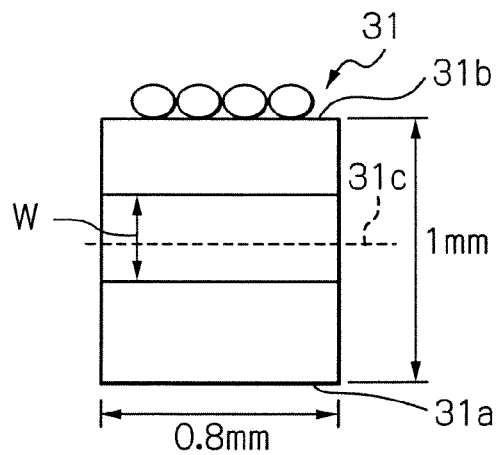
FIGS. 11a to 11c are views illustrating the result of simulation of the amount of change in crown with respect to a coated width of a resin adhesive used for fixing the magnetic head slider to the tongue portion with and without heating of the heater member, and a view illustrating the result of simulation of the amount of change in crown with respect to the power for driving the heater member under different coated widths of the resin adhesive.
Figure 11B:
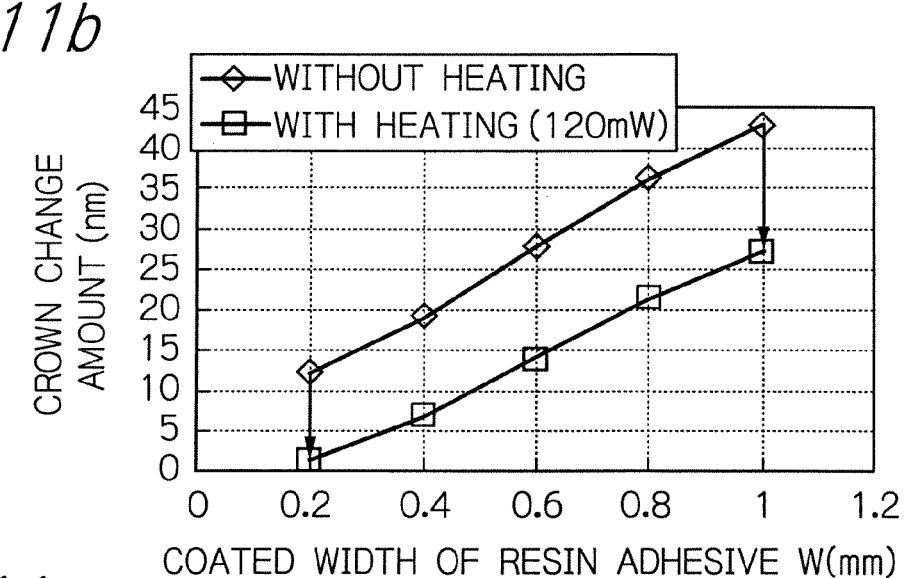
Figure 11C:
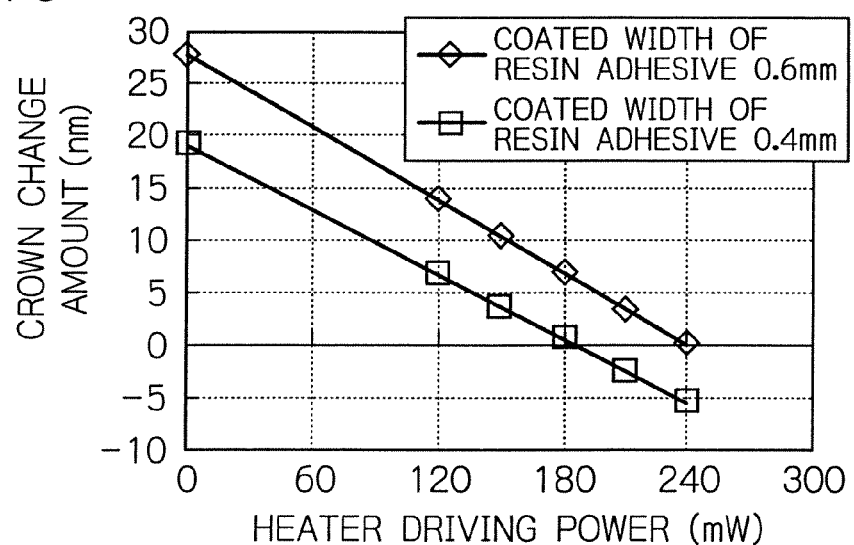

FIG. 11a illustrates a coated width W of a resin adhesive used for fixing the magnetic head slider to the tongue portion and dimension of the slider, FIG. 11b illustrates the result of simulation of the crown change amount or the amount of change in crown with respect to the coated width of the resin adhesive with and without heating of the heater member, and FIG. 11c illustrates the result of simulation of the amount of change in crown with respect to the power for driving the heater member under different coated widths of the resin adhesive. In other words, these figures illustrate the simulated results how the crown change amount varies depending upon heating of the heater member, depending upon the coated width of the resin adhesive used for fixing the magnetic head slider to the tongue portion, and depending upon the power for driving the heater member.

The simulation was executed under the following conditions. The magnetic head slider 31 is made of AlTiC with the dimension of a longitudinal length, that is a length from the leading edge 31a to the trailing edge 31b, of 1 mm, a lateral length perpendicular to the longitudinal length, of 0.82 mm and a thickness of 0.3 mm as shown in FIG. 11a. The tongue portion of the flexure is made of a stainless steel plate. The coated width W of the resin adhesive is a longitudinal width with its center positioned on a central line 31c of the leading edge 31a and the trailing edge 31b as shown in FIG. 11a. As shown in FIG. 11b, the narrower of the coated width W of the resin adhesive, the lower in the crown change amount. However, when the power of 120 mW is applied to the heater member, the crown change amount decreases about 10-16 nm at any coated width W of the resin adhesive. Further, as shown in FIG. 11c, it will be understood that the crown change amount linearly decreases in response to the increase in power for driving the heater member although the absolute amount of the crown change differs depending upon the coated width of the resin adhesive.

Figure 12:
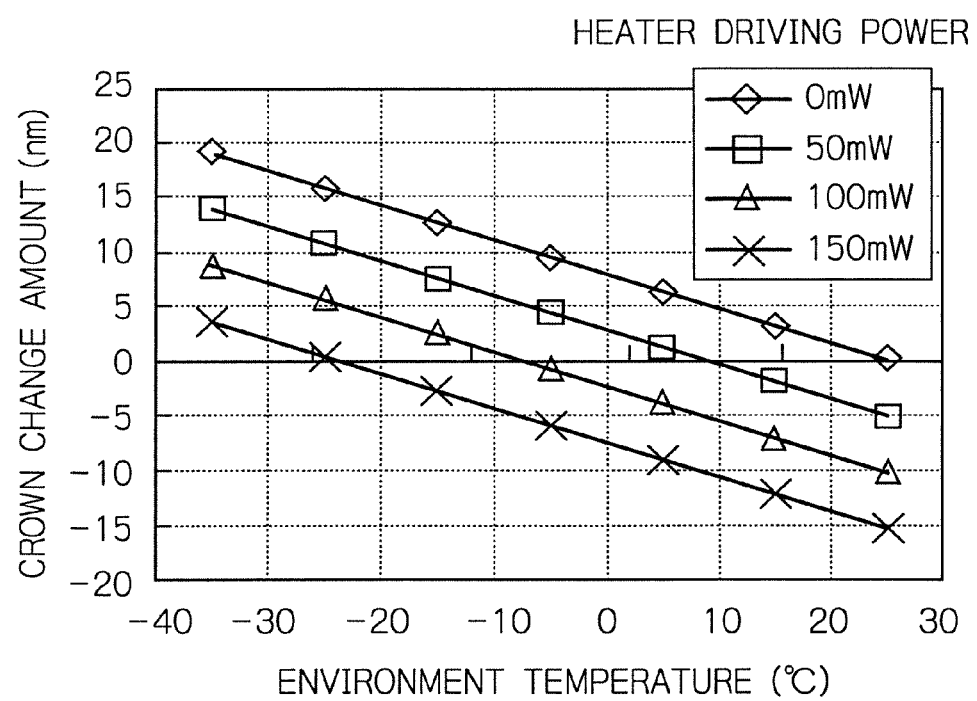
FIG. 12 is a view illustrating the result of simulation of the amount of change in crown with respect to the environment temperature under different powers for driving the heater member.

FIG. 12 illustrates the result of simulation of the amount of change in crown with respect to the environment temperature under different powers for driving the heater member.

As will be noted from the figure, the crown change amount linearly increases depending upon the decrease in the environment temperature but decreases depending upon the increase in the heater driving power.

Figure 13:
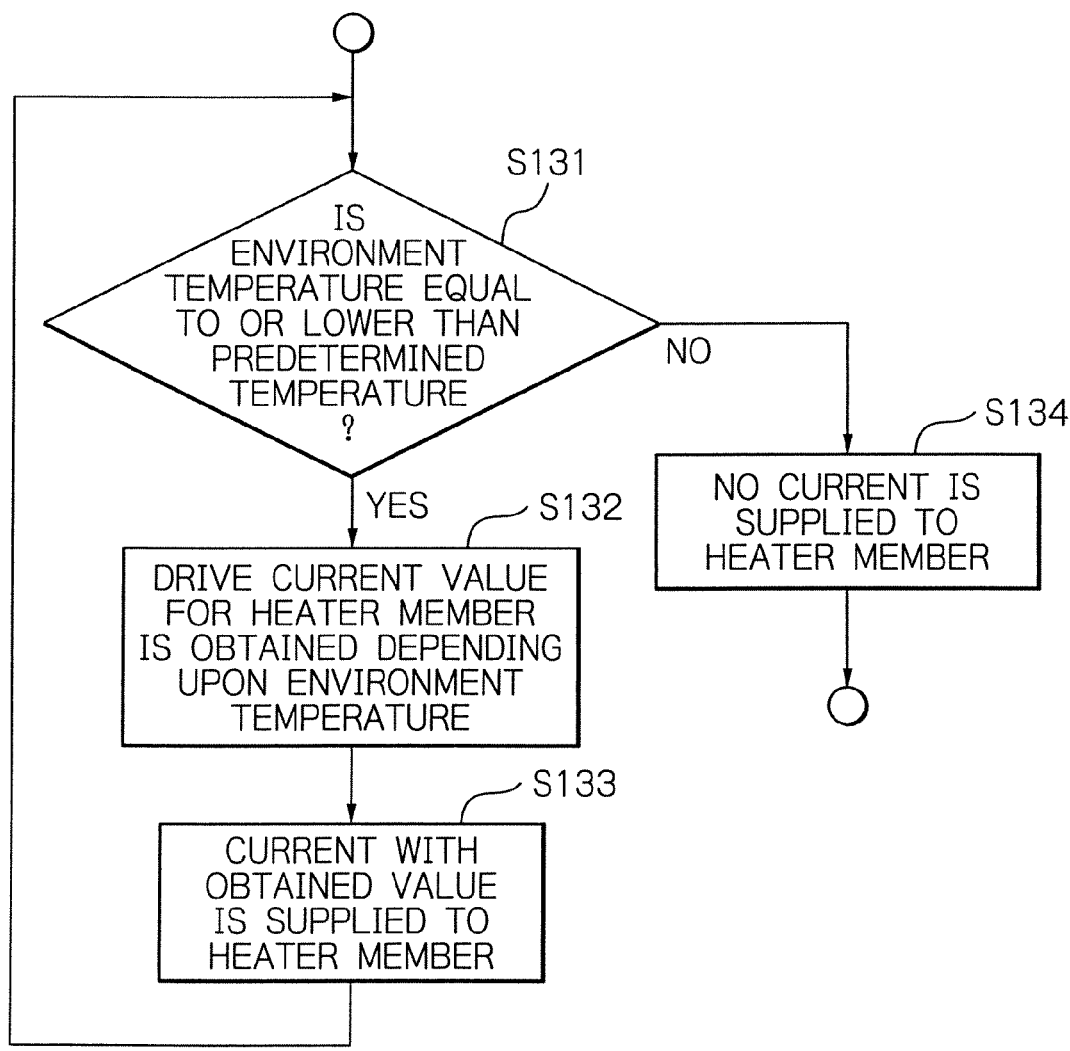
FIG. 13 is a flow diagram illustrating an example of a drive control method of a heater member, executed by a computer in another embodiment according to the present invention.

FIG. 13 illustrates an example of a drive control method of a heater member, executed by a computer in another embodiment according to the present invention.

Constitutions of the HDD apparatus in this embodiment are the same as that in the embodiment of FIG. 2 except for software of the computer 75.

The drive control process shown in FIG. 13 is repeatedly executed for example at a predetermined time interval when the HDD apparatus is in operation. First, using the digital temperature signal detected by the temperature sensor 73 and A/D converted, whether the environment temperature is equal to or lower than a predetermined temperature for example 5° C. or not is judged (Step S131).

If it is judged YES, that is if the environment temperature is equal to or lower than 5° C., a drive current for driving the heater member at that environment temperature is obtained (Step S132). A value of the drive current may be obtained from a table that represents relationship between the environment temperature and the drive current and is stored in the computer 75, or from calculation using a mathematical expression that represents relationship between the environment temperature and the drive current.

Then, the heater member driver circuit 77 is energized to supply a drive current with the obtained value to the heater member 36 (Step S133).

Then, the judgment process at the step S131 is executed again.

If it is judged NO at the step S131, that is if the environment temperature is higher than 5° C., the heater member driver circuit 77 is instructed to supply no current to the heater member 36 and this drive control process is finished (Step S134).

By supplying the current with the environment temperature dependent value to the heater member 36, this heater member 36 heats both the tongue portion 33a of the flexure 33 and the magnetic head slider 31 to the temperature appropriate for that environment temperature.

Figure 14:
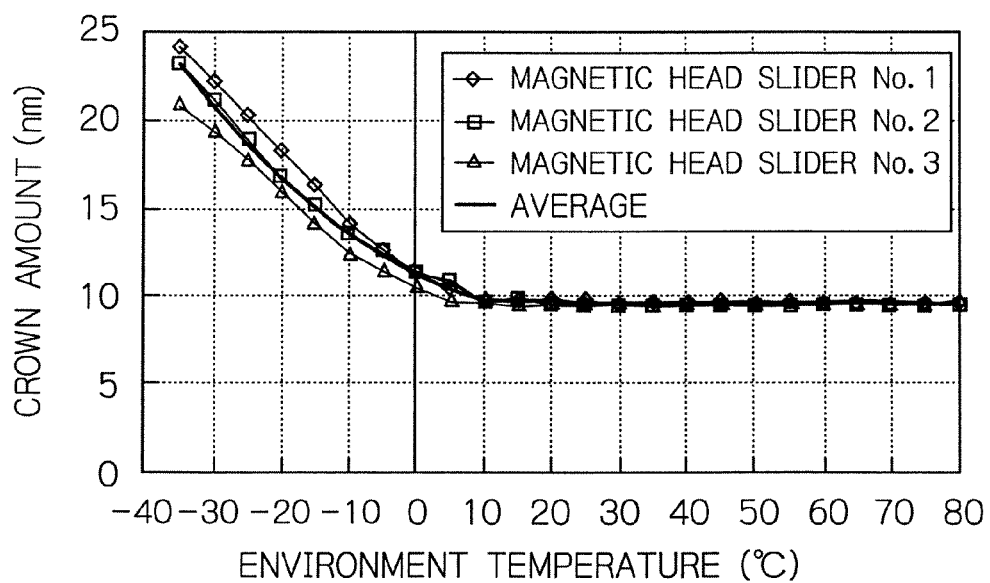
FIG. 14 is a view illustrating the measured result of the amount of change in crown with respect to the environment temperature for a plurality of magnetic head sliders and the calculated average thereof when no heater member is provided or no current flows through each heater member.

FIG. 14 illustrates the measured result of the amount of change in crown with respect to the environment temperature for a plurality of magnetic head sliders and the calculated average thereof when no heater member is provided or no current flows through each heater member.

As will be noted from the figure, when the environment temperature is equal to or lower than 5-10° C., the crown amount increases depending upon the environment temperature. Therefore, it is desired to control in real time the drive current supplied to the heater member in accordance with the environment temperature at that time.

Figure 15:
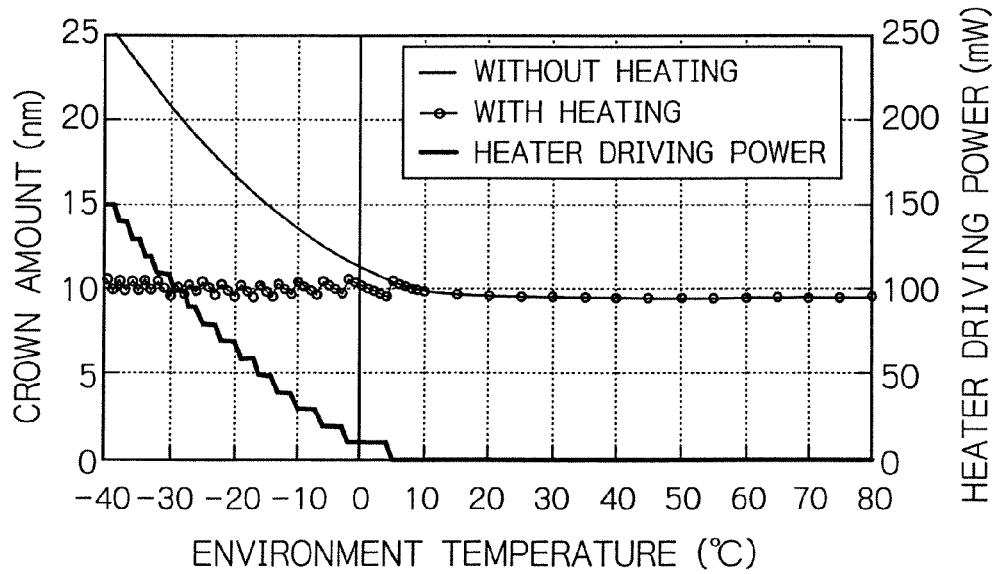
FIG. 15 is a view illustrating an example of control method of the drive current flowing through a heater member in the embodiment shown in FIG. 13 and the measured result of the amount of change in crown with respect to the environment temperature in this example.
Figure 16:
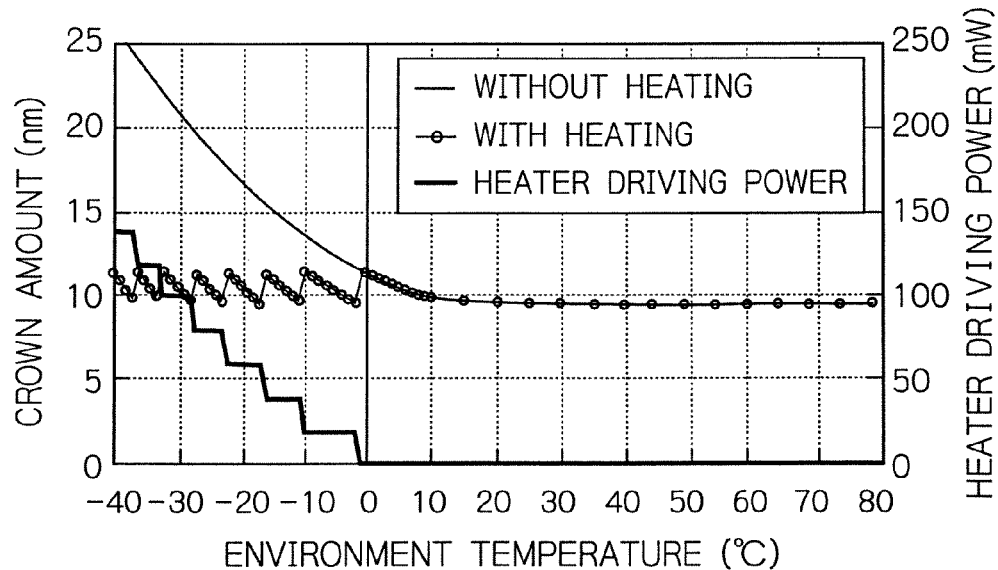
FIG. 16 is a view illustrating another example of control method of the drive current flowing through a heater member in the embodiment shown in FIG. 13 and the measured result of the amount of change in crown with respect to the environment temperature in this example.
Figure 17:
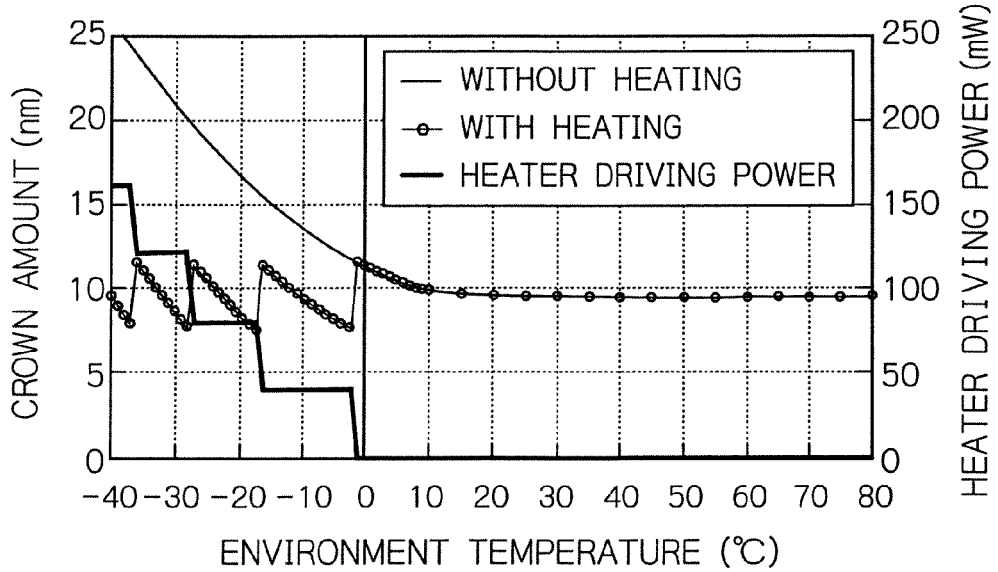
FIG. 17 is a view illustrating further example of control method of the drive current flowing through a heater member in the embodiment shown in FIG. 13 and the measured result of the amount of change in crown with respect to the environment temperature in this example.

FIGS. 15-17 illustrate examples of control method of the drive current flowing through a heater member in the embodiment shown in FIG. 13 and the measured result of the amount of change in crown with respect to the environment temperature in these examples.

As shown in these figures, according to this embodiment, since the drive current flowing through the heater member is variably controlled in real time in response to the environment temperature at that time, the crown amount can be appropriately controlled without increasing.

In these examples, the heater drive current is controlled step-by-step depending upon the environment temperature. However, in modifications, the heater drive current may be continuously controlled depending upon the environment temperature.

Further, in modifications, the drive current value may be determined by executing discrimination processes to classify the environment temperature without using the table nor the mathematical expression.

Figure 18:
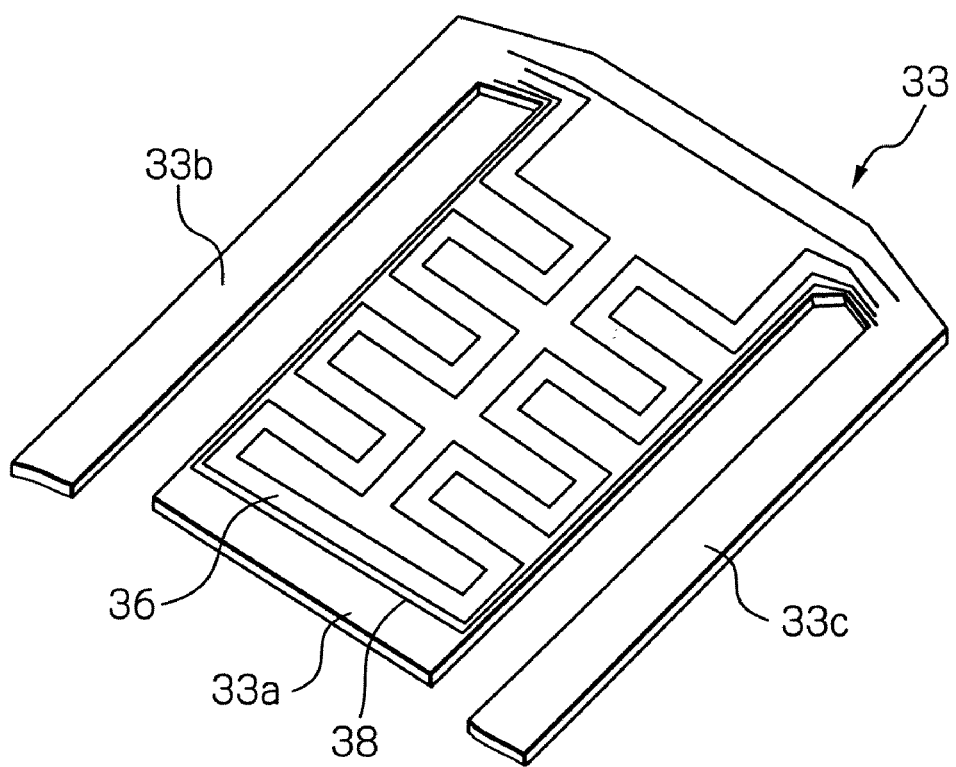
FIG. 18 is an oblique view illustrating a configuration of a tongue portion formed at a top end section of a flexure of an HGA in further embodiment according to the present invention.

FIG. 18 illustrates a configuration of a tongue portion formed at a top end section of a flexure of an HGA in further embodiment according to the present invention. In this embodiment, the heater member 36 is formed in a flexible printed circuit (FPC) board. Other configurations of this embodiment are the same as these of the embodiment of FIG. 2. Therefore, in FIG. 18, the same components are indicated by using the same reference numerals as those in FIG. 5.

As shown in the figure, the flexure 33 has at its top end section a resilient tongue portion 33a for mounting a slider, and outrigger portions 33b and 33c positioned at both sides of the tongue portion 33a with spaces. On the tongue portion 33a of the flexure 33, a FPC 38 is fixed. In the FPC 38, an electrothermal heater member 36 is formed in a pattern.

The heater member 36 is constituted by a thin-film of an electrothermal material such as W or NiCr for example. It is desired that the heater member 36 is formed in the FPC 38 as a pattern to cover the whole surface of the tongue portion 33a. However, the practical pattern shape of this heater member 36 can be freely designed. Although it is not shown in the figure, both ends of the heater member 36 are electrically connected to one ends of the trace conductors of the lead conductor member 35 formed in the FPC 38.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A magnetic disk drive apparatus including a magnetic head assembly and a magnetic disk to which a magnetic head slider of said magnetic head assembly faces, said magnetic head assembly comprising:
    said magnetic head slider with a thin-film magnetic head;
    a suspension having a slider mounting section, for supporting said magnetic head slider fixed to said slider mounting section; and
    a heating means formed on said slider mounting section of said suspension, said heating means being capable of producing heat and including a heater member patterned on said slider mounting section or patterned in a flexible printed circuit fixed on said slider mounting section; and
    an electrical control means electrically connected to said heater member, for driving said heater member to produce heat under a low temperature environment.

2. The magnetic disk drive apparatus as claimed in claim 1, wherein said electrical control means comprises a low temperature environment detection means for detecting that the magnetic disk drive apparatus is under a low temperature environment, and a current control means for controlling a current flowing through said heater member in accordance with the detected result of said low temperature environment detection means.

3. The magnetic disk drive apparatus as claimed in claim 2, wherein said low temperature environment detection means comprises a temperature detection means for detecting environment temperature of the magnetic disk drive apparatus, and wherein said current control means comprises means for supplying a constant current to said heater member only when the environment temperature detected by said temperature detection means is equal to or lower than a predetermined temperature.

4. The magnetic disk drive apparatus as claimed in claim 2, wherein said low temperature environment detection means comprises a temperature detection means for detecting environment temperature of the magnetic disk drive apparatus, and wherein said current control means comprises means for substantially continuously changing a current flowing through said heater member depending upon the environment temperature detected by said temperature detection means.

5. The magnetic disk drive apparatus as claimed in claim 2, wherein said low temperature environment detection means comprises a temperature detection means for detecting environment temperature of the magnetic disk drive apparatus, and wherein said current control means comprises means for changing a current flowing through said heater member step-by-step depending upon the environment temperature detected by said temperature detection means.

6. The magnetic disk drive apparatus as claimed in claim 1, wherein said suspension comprises a resilient flexure containing said slider mounting section and a load beam for supporting said flexure.

7. The magnetic disk drive apparatus as claimed in claim 6, wherein said slider mounting section is a tongue portion of said flexure, said tongue portion having a thermal expansion coefficient greater than that of said magnetic head slider.

8. The magnetic disk drive apparatus as claimed in claim 7, wherein said magnetic head slider is made of a ceramic material and said flexure is made of a metal material.

* * * * *